J. GARNERO.
PRIMING DEVICE FOR GASOLENE ENGINES.
APPLICATION FILED SEPT. 28, 1917.

1,264,054.

Patented Apr. 23, 1918.
2 SHEETS—SHEET 2.

WITNESSES

INVENTOR
J. Garnero,
BY Victor J. Evans
ATTORNEY

UNITED STATES PATENT OFFICE.

JOHN GARNERO, OF JUNEAU, TERRITORY OF ALASKA.

PRIMING DEVICE FOR GASOLENE-ENGINES.

1,264,054.　　　　　　Specification of Letters Patent.　　Patented Apr. 23, 1918.

Application filed September 28, 1917.　Serial No. 193,792.

*To all whom it may concern:*

Be it known that I, JOHN GARNERO, a subject of the King of Italy, residing at Juneau, Territory of Alaska, have invented new and useful Improvements in Priming Devices for Gasolene-Engines, of which the following is a specification.

This invention relates to a priming device for a gasolene engine and one of the objects is to provide in a construction of the character indicated, means whereby the engine may be primed by the movement of a rod controlling a plurality of fuel inlet devices, said rod being operable from a point within convenient reach of a driver of an automobile or the like.

A further object is to provide in connection with a plurality of fuel inlets, a pipe having connection with each of such inlets, and adapted to receive a supply of fuel from the carbureter intake upon the operation of a pump, said supply pipe being reciprocated upon the movement of a rod for the purpose of opening the fuel inlet devices leading to the cylinders.

With the foregoing and other objects in view, the invention consists in the novel construction hereinafter described and claimed.

Figure 1:
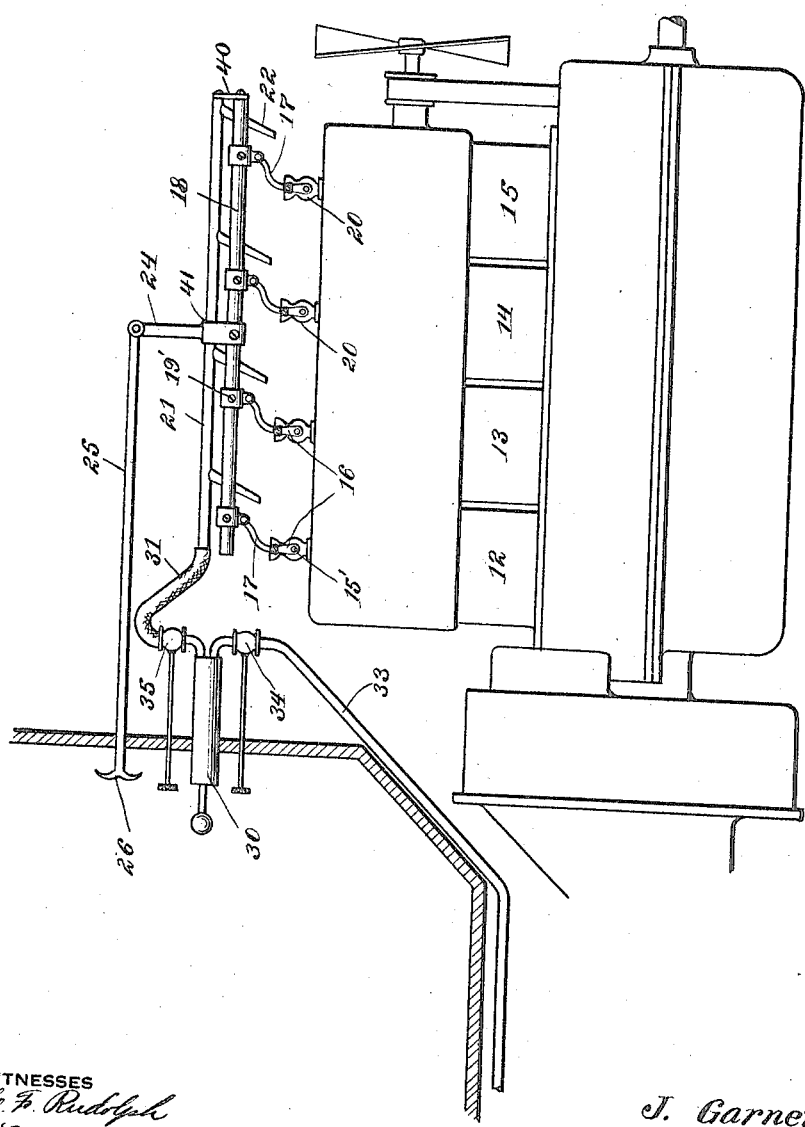
Figure 1 is a diagrammatic view of an engine with the priming device in elevation.
Figure 2:
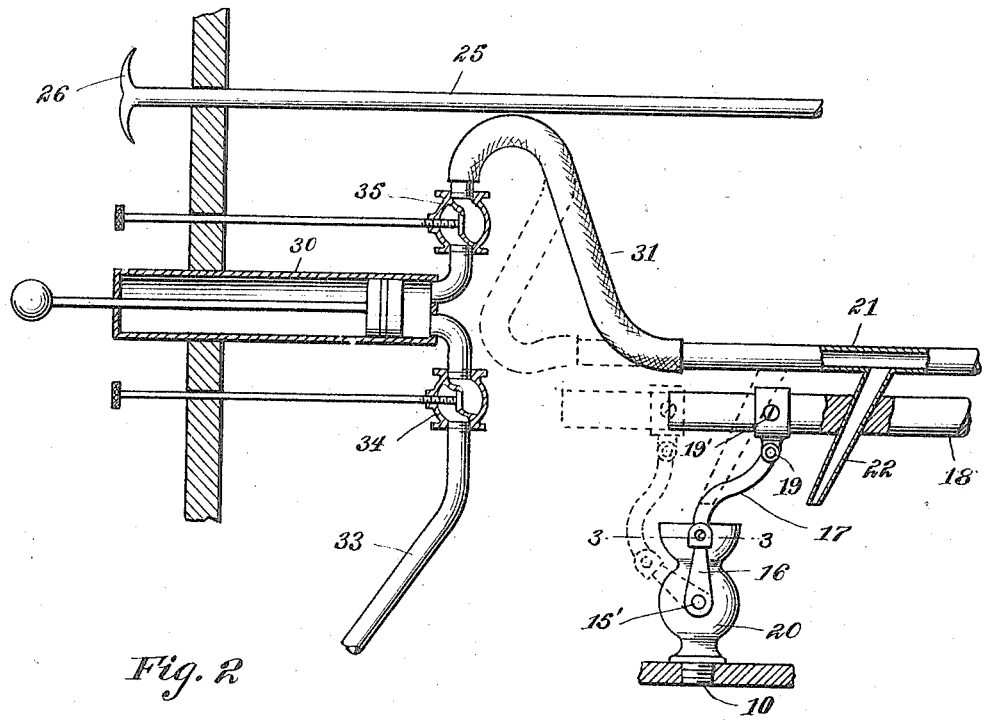
Fig. 2 is partly in elevation and partly in vertical section and shows certain of the operative elements in dotted line and full line position.

Each of the cylinders of the engine is provided with a fuel inlet device indicated by 10, the aforesaid cylinders being designated 12, 13, 14 and 15. These inlets are under the control of valves 15' provided with operating members or arms 16 connected with arms 17 formed as illustrated, these arms having pivotal connection with a longitudinally extending bar 18, by means of a joint 19. The priming cups are designated 20 and the fuel inlet pipe is shown at 21 and is provided with branch pipes 22 extending downwardly therefrom to points in proximity to said cups. This pipe is movable longitudinally by means of reciprocating bar 18 having an arm 24 connected therewith, this arm being under control of the rod 25 operated by means of a handle 26 within convenient reach of the driver of the automobile.

Pipe 21 is connected with a pump 30 by means of a section of tubing 31 comprising a rubber hose with suitable covering, as for instance, that employed for the flexible shaft of a speedometer. Pump 30 is connected with the carbureter intake, not shown, by means of a tube 33 under control of a valve 34. The connection between the tube 31 and the pump is under the control of a valve 35. In charging the device the valve 34 is opened and the pump handle 37 is drawn outwardly for the purpose of admitting the liquid fuel. Valve 34 is then closed and valve 35 is opened and the pump handle is forced inwardly, the piston serving to force the fuel into the pipe 21. Upon the operation of the rod 25, by means of the handle 26, the valves 15' are opened and the fuel passes from said pipe 21 into the cylinders of the engine.

After priming the engine, the pump handle is pulled for emptying the pipe, valve 35 is closed and valve 34 opened, and the pump handle again forced inwardly throwing any remaining portion of the liquid fuel back through pipe 33.

Figure 3:
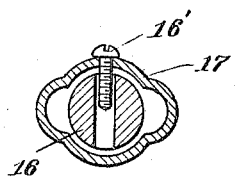
Fig. 3 is a section on the line 3—3 of Fig. 2.

The ports of the valve members may be arranged as illustrated, and the connections with bar 18 so adjusted that the compression within the cylinders will be relieved just before the feed tubes 22 come into position and the charge is admitted to the cups. Set screws 19' permit of the adjustment of pivotal connections 19, and it should be added that the arms 17 have the cross section illustrated in Fig. 3, so that they will fit either a flat or round handle or operating arm 16. Set screws 16' serve to make proper connection at this point. Bar 18 and pipe 21 may be rigidly connected in any suitable manner as indicated at 40 and 41.

The feed tubes 22 vary in size, the tube nearest the pump being the smallest, the next of somewhat greater diameter, and so on, in order to regulate the flow of liquid fuel.

What is claimed is:

1. In a device of the class described, a pipe mounted for longitudinal movement, a plurality of discharge members connected therewith, means for supplying fuel to said pipe, a plurality of fuel receptacles, each receptacle being located adjacent to one of the discharge members but normally spaced therefrom, valves connected with the latter, and means for simultaneously shifting said pipe and opening the valves.

2. In a device of the class described, a pipe mounted for longitudinal movement, a bar rigidly connected with said pipe, a plurality of discharge members also connected with the pipe, means for supplying fuel to the pipe, a plurality of fuel receptacles, each receptacle being located adjacent to one of the discharge members but normally spaced therefrom, valves connected with the receptacles and means pivotally connecting said valves with the bar.

3. In a device of the class described, a pump, a longitudinally movable pipe to be supplied with fuel from said pump and having flexible connection therewith, a plurality of discharge members connected with the pipe, a bar having rigid connection with said pipe, a plurality of fuel receptacles and means for shifting the bar, said bar in turn shifting the pipe for placing the discharge members in operative position with reference to the fuel receptacles.

4. In a device of the class described, a plurality of fuel receptacles, a valve connected with each receptacle, a longitudinally movable bar, a plurality of arms pivotally connected with the bar and with said valves, a pipe adapted to move with the bar, a pump having flexible connection with the pipe, said pump having connection with a source of fuel supply for charging said pipe, and means for admitting fuel from the pipe to the receptacles when said bar is shifted to open the valves.

5. In a device of the class described, a plurality of fuel receptacles, a fuel supply pipe positioned above said receptacles, discharge members connected with the pipe and normally located at one side of the receptacles, a longitudinally movable bar having rigid connection with the pipe and adapted to shift the latter and place the discharge members in operative position with reference to the receptacles, a valve connected with each receptacle and pivotally connected with said bar, and means for operating the bar for opening the valves and simultaneously placing the fuel discharge members in operative position.

6. In a device of the class described, a plurality of fuel receptacles, a fuel pipe movable longitudinally with reference thereto, discharge members connected with said pipe and normally positioned out of alinement with the receptacles, valves connected with the receptacles, a pump for supplying fuel to the pipe, a source of fuel supply, a valve between said source and pump, and a valve between the pump and the fuel supply pipe, first named, and means for shifting the position of the pipe longitudinally.

7. In a device of the class described, a plurality of fuel receptacles, each provided with an outlet, a valve controlling each outlet, a link having pivotal connection with each valve, a longitudinally movable bar connected with each link, means for shifting the position of said bar, a fuel supply pipe movable longitudinally by the bar, a plurality of supply members connected with said pipe and normally positioned out of alinement with the receptacles, and means for shifting said bar and pipe and throwing the supply members into position above the receptacles and opening the valves connected with said receptacles.

In testimony whereof I affix my signature.

JOHN GARNERO.

Copies of this patent may be obtained for five cents each, by addressing the "Commissioner of Patents, Washington, D. C."